United States Patent
Debrunner

(10) Patent No.: US 7,962,454 B2
(45) Date of Patent: *Jun. 14, 2011

(54) CENTRAL DATABASE SERVER APPARATUS AND METHOD FOR MAINTAINING DATABASES ON APPLICATION SERVERS

(75) Inventor: Daniel J. Debrunner, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,509

(22) Filed: Sep. 24, 2010

(65) Prior Publication Data

US 2011/0022569 A1     Jan. 27, 2011

Related U.S. Application Data

(62) Division of application No. 10/653,833, filed on Sep. 3, 2003, now Pat. No. 7,873,602.

(51) Int. Cl.
  *G06F 7/00* (2006.01)
  *G06F 17/00* (2006.01)
(52) U.S. Cl. ............... 707/661; 707/802; 711/161
(58) Field of Classification Search ............... None
See application file for complete search history.

(56) References Cited

U.S. PATENT DOCUMENTS

| | | | |
|---|---|---|---|
| 6,026,437 A | 2/2000 | Muschett et al. | |
| 6,535,894 B1 | 3/2003 | Schmidt et al. | |
| 6,542,887 B1* | 4/2003 | Abbott | 1/1 |
| 6,560,618 B1 | 5/2003 | Ims | |
| 6,999,976 B2 | 2/2006 | Abdallah et al. | |
| 7,051,316 B2 | 5/2006 | Charisius et al. | |
| 7,085,739 B1 | 8/2006 | Winter et al. | |
| 7,171,422 B2* | 1/2007 | Hayes et al. | 1/1 |
| 7,185,071 B2* | 2/2007 | Berg et al. | 709/220 |
| 7,206,817 B2* | 4/2007 | Fanshier et al. | 709/208 |
| 7,228,326 B2 | 6/2007 | Srinivasan et al. | |
| 7,412,480 B2* | 8/2008 | Baentsch et al. | 709/203 |
| 7,478,142 B1* | 1/2009 | Veditz | 709/218 |
| 7,503,034 B2* | 3/2009 | Berg et al. | 717/120 |
| 7,506,342 B2* | 3/2009 | Mousseau et al. | 719/320 |
| 7,548,898 B1 | 6/2009 | Tarenskeen et al. | |
| 7,873,602 B2* | 1/2011 | Debrunner | 707/661 |
| 2002/0104071 A1 | 8/2002 | Charisius et al. | |
| 2002/0143792 A1 | 10/2002 | Belu | |
| 2002/0178439 A1* | 11/2002 | Rich et al. | 717/174 |
| 2003/0018614 A1 | 1/2003 | Hayes | |

(Continued)

OTHER PUBLICATIONS

Feature Overview-Oracle9i Application Server Oracle 9iAS Containers for J2EE (9.0.3); Oracle web page—(http://otn.com/tech/java/oc4j/htdocs/oc4j-fov-html); pp. 1-13; May 1, 2003.

*Primary Examiner* — Usmaan Saeed
(74) *Attorney, Agent, or Firm* — Tucker Ellis & West LLP

(57) ABSTRACT

A central database server (10) supports a central database (12) that contains central database content. A first archiving module (30) archives central database content into a content archive (32). A second archiving module (44) archives the content archive (32) and supporting software (18, 46) into an application archive (50). An application server (20) supports a computer code execution environment (60) for executing the application archive (50) to organize the content of the content archive (32) into a database on the application server (20).

12 Claims, 4 Drawing Sheets

U.S. PATENT DOCUMENTS

| | | |
|---|---|---|
| 2003/0078958 A1 | 4/2003 | Pace et al. |
| 2003/0158832 A1* | 8/2003 | Sijacic et al. .................... 707/1 |
| 2003/0204420 A1* | 10/2003 | Wilkes et al. .................... 705/3 |
| 2003/0212990 A1 | 11/2003 | Brodkorb et al. |
| 2004/0015859 A1* | 1/2004 | Potter et al. .................. 717/120 |
| 2004/0078495 A1 | 4/2004 | Mousseau et al. |
| 2004/0088681 A1* | 5/2004 | Berg et al. .................... 717/120 |
| 2004/0123285 A1* | 6/2004 | Berg et al. .................... 717/174 |
| 2004/0220980 A1* | 11/2004 | Forster ......................... 707/204 |
| 2005/0050155 A1* | 3/2005 | McGee et al. ................ 709/213 |
| 2006/0167949 A1* | 7/2006 | Berger et al. ................. 707/200 |
| 2007/0100953 A1* | 5/2007 | Fanshier et al. .............. 709/208 |

* cited by examiner

CENTRAL DATABASE SERVER APPARATUS AND METHOD FOR MAINTAINING DATABASES ON APPLICATION SERVERS

CROSS REFERENCE TO RELATED APPLICATIONS

This application is a divisional application of U.S. patent application Ser. No. 10/653,833; filed Sep. 3, 2003.

BACKGROUND OF THE INVENTION

1. Field of the Invention

The present invention relates to the art of information processing. It finds particular application in relational database systems accessed regionally, nationally or globally over the Internet or a wide area network, and will be described with particular reference thereto. However, the present invention is useful in enhancing accessibility of other types of databases to users over wide geographical areas.

2. Description of Related Art

Relational databases are widely used for storing, sorting, delivering, and otherwise processing large volumes of similar and/or dissimilar data. By combining the relational database paradigm with the Internet, a large corporate intranet, or other wide area network, large numbers of users can access database contents, or selected portions thereof, regionally, nationally, or globally. However, large numbers of users accessing a central database can create substantial bottlenecks which slow the database system, creating delays, timeouts, and other problems.

The use of application servers can reduce this bottleneck. The application servers process user requests by accessing the central database server. The application servers may include servers within a intranet, firewall, or other secure computing environment, and/or may include servers distributed across the Internet. These latter distributed application servers are also known as edge servers. In some cases, the edge servers do not directly access the central database server, but rather proxy database requests through an intermediate application server residing inside of the firewall. Application servers reduce bottlenecking at the central database by extracting database content in a portable format, such as a text file format, and inserting the extracted portable content into a remote database maintained by the application server.

While this approach is beneficial, some difficulties remain. Typically, the entire database contents are not efficiently converted to a portable format due to processing and communication constraints. Thus, the intermediate application servers frequently access the central database server to extract additional data to update the edge database or to satisfy user requests for additional data. Moreover, some data types may be incompatible with the selected portable format. For example, graphical images may be difficult to convert to a text format.

In another approach, data is archived, and the archive file is transferred from the central database server to the edge servers where it is unpacked or otherwise accessed. Advantageously, this approach can support substantially all data types. However, certain difficulties still remain. The archived content is unpacked and stored on the edge server in a native format which is typically specific to the edge server. Thus, the updating may require edge server-specific parameters such as identification of the storage medium, a file path, and the like. This edge server-specificity makes updating large numbers of edge servers difficult. In some existing database networks, tens of thousands of edge servers are supported by the central server, making server-specific updating burdensome.

Another problem arises with updating. Typically, the edge server in this approach is updated by generating an updated archive file at the central database server and transferring the updated archive file to the edge server. The unpacked contents of the previous archive file are invalidated, which causes open application connections to the edge server database to be closed. The applications are then restarted to establish connections to the updated edge server database. Closing the open application connections can create problematic interruptions in uncommitted transactions and can disrupt or terminate user sessions.

The present invention contemplates an improved method and apparatus which overcomes these limitations and others.

SUMMARY OF THE INVENTION

In accordance with one aspect, an application server is disclosed for supporting a remote database adapted to receive database data pushed into the remote database by a central database server. A computer code execution environment is adapted to execute self-contained application archive files including a database application archive which archives a content archive containing content extracted from the central database server, schema of a central database of the central database server, and computer code including a database engine adapted to organize the content of the content archive into a database in accordance with said schema contained in said database application archive.

In accordance with another aspect, a central database server is disclosed. A central database contains central database content. A first archiving module archives at least some of the central database content into a content archive. A second archiving module archives the content archive and supporting software into an executable application archive. The executable application archive is adapted to be executed by a remote application server, said executing including executing the supporting software to access the content archive.

In accordance with another aspect, an instance of a distributed database is disclosed. The instance includes a database engine and data content and schema. The schema provide a logical description of the data content. The data content and schema are arranged as one of database server files and an archive file. The database engine is adapted to provide read/write access to the data content conditional upon the data content and schema being arranged as database server files, and read-only access to the data content conditional upon the data content and schema being arranged as an archive file.

In accordance with yet another aspect, a method is provided for distributing database content. At least some content of a central database residing on a central database server is archived as a content archive file. The content archive and supporting software are archived as a distribution archive file. The distribution archive file is distributed to a plurality of application servers other than the central database server. The application servers each have an operating environment adapted to execute the distribution archive file.

In accordance with still yet another aspect, a method is provided for maintaining an edge database on an application server. A database archive file is received at the application server. The database archive file contains a content archive file archiving at least some content of a central database, and supporting software including at least a database engine adapted to access the content archive file contained in the database archive file. The database archive file is deployed on the application server to effect a database instance providing read-only access to the at least some content of the central database.

Numerous advantages and benefits of the invention will become apparent to those of ordinary skill in the art upon reading and understanding this specification.

BRIEF DESCRIPTION OF THE DRAWINGS

The invention may take form in various components and arrangements of components, and in various process operations and arrangements of process operations. The drawings are only for the purposes of illustrating preferred embodiments and are not to be construed as limiting the invention.

DETAILED DESCRIPTION OF THE PREFERRED EMBODIMENTS

Figure 1:
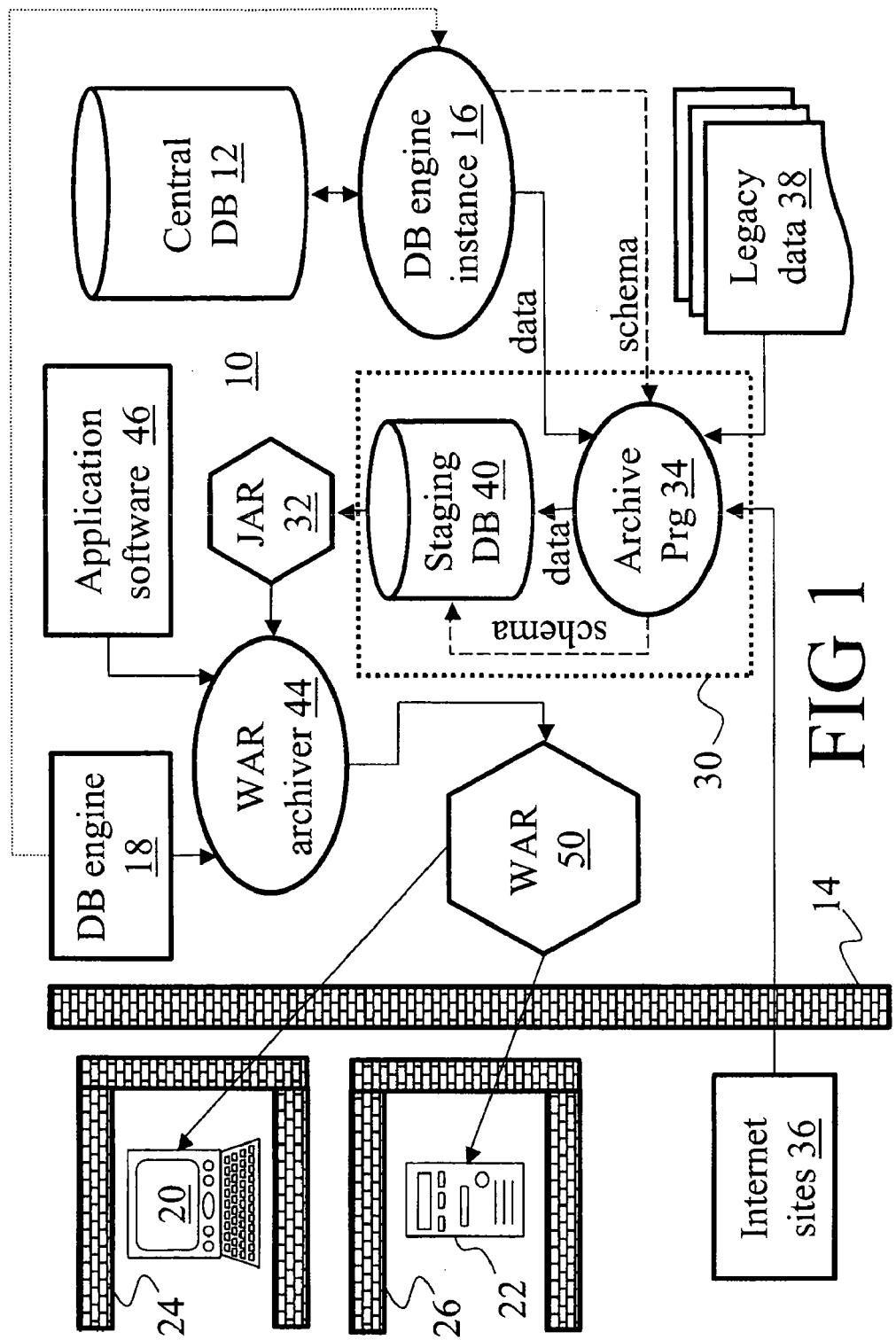
FIG. 1 diagrammatically shows an exemplary central database server that creates a machine-independent database application archive for distributing an edge database to application servers.

With reference to FIG. 1, a central database server 10 supports a central database 12, and is protected from unauthorized access by a firewall 14. The central database 12 is a relational database, a hierarchal database, a network database, or the like, and includes content such as text, numerical data, images, or the like. The database 12 is organized by a logical description of the data in a database, including definitions and relationships of data, collectively referred to as schema. The database 12 is accessible via an executing instance 16 of a database engine software program 18 that is stored at or accessible by the central database server 10.

As is recognized in the art, access to the central database server 10 may be limited by network congestion, delays or restrictions imposed by the firewall 14, or the like. To address these access limitations, a plurality of application servers such as exemplary application servers 20, 22 are maintained. Although two exemplary application servers 20, 22 are shown in FIG. 1, it is to be appreciated that the number of application servers supported by the central database server 10 may number in the hundreds, thousands, or tens of thousands. Indeed, there is no practical upper limit on the number of supported application servers. Optionally, some or all of the application servers are protected from unauthorized access by firewalls 24, 26. Application servers can be arranged outside of the firewall 14, as shown. Some application servers may be arranged inside of the firewall 14, and are optionally employed as proxies for accessing the central database server 10. Application servers arranged outside of the firewall 14 of the central database server 10 and distributed widely across the Internet are sometimes referred to in the art as edge servers. Database users access the application servers 20, 22 to perform read-only database queries, which substantially reduces the load on the central database server 10.

It will be appreciated that the application servers, such as the exemplary application servers 20, 22, may employ different operating systems, different non-volatile storage media, different logical drive nomenclatures, and the like. For example, the exemplary application server 20 is a networked high-power personal computer operating under a Windows-based environment, while the exemplary application server 22 is a local area network server operating under a LINUX operating system. Similarly, MacOS, UNIX, or other operating systems can be employed in the application servers. The various application servers may employ different logical drive nomenclatures. For example, the Windows-based machine 20 may store its edge database on a drive path designated "C:.backslash.catalog.backslash.data", while the local area network application server 22 may store its edge database on a different drive path, such as an exemplary drive path designated "/dev/hdbl/cat/db". Because of these and other types of substantial differences between the supported application servers, and the typically large number of application servers which may number in the thousands or tens of thousands or more, database content from the central database 12 that is pushed to the application servers 20, 22 is preferably formatted in a machine- and operating system-independent portable format.

To provide content in a portable format, a first archiving module 30 archives content of the central database 12, or portions thereof, along with schema of the central database 12, or portions thereof, into a content archive 32, which is preferably a Java archive (JAR) file. The Java archive format is supported, for example, by the Java 2 enterprise edition (J2EE) platform.

In one suitable embodiment shown in FIG. 1, the first archiving module 30 includes an archiving program 34 that collects content from the central database 12 via the database engine instance 16. Optionally, the archiving program 34 additionally collects content from other sources such as Internet sites 36 or legacy data sources 38. The archiving program 34 also receives schema from the central database 12, and organizes the collected data and received schema into a staging database 40. Contents of the staging database 40 are packaged into the JAR file or other content archive 32 by a database backup operation applied to the staging database 40. Alternatively, a separate Java archiving program can be employed to create the JAR file from contents of the staging database 40. Although the archiving program 34 and the staging database 40 are shown as separate components in FIG. 1, it is also contemplated to integrate the archiving program and the staging database as a unitary backup or JAR archiving program.

The content archive 32 is suitably in a Java archive format or other format that allows access to the content without unpacking the content to a local file system or other machine-dependent environment. In the preferred JAR embodiment, the database within the JAR 32 is provided with a database logical name (DBLN) and a unique database identifier (DBID). Preferably, the content archive 32 is assigned a version number to facilitate coordination of content updating.

To provide a portable and machine independent database package for distribution to application servers 20, 22 across a distributed database system, a second archiving module 44 preferably archives the content archive 32, along with supporting software including the database engine 18 and optional additional application software 46, into a self-contained executable application archive file 50. In the illustrated embodiment, the application archive file is a web archive (WAR) file; however, other application archive file formats can be employed, such as an Enterprise application archive (EAR) file. Both WAR archives and EAR archives are supported by the preferred J2EE platform, and can be created for example by using the packager tool distributed with the J2EE software development kit (SDK), or by using the war task of the Ant J2EE portable build tool.

The content archive 32 is arranged in the application archive file 50 such that the content archive 32 is accessible through a machine-independent access method. In the preferred embodiment employing a JAR content archive 32 and the J2EE platform, this can be accomplished by placing the JAR content archive 32 in the WEB-INF/lib folder of the exemplary WAR application archive file 50, or by setting the Class-Path entry in a manifest file to include the JAR content archive 32. The WAR, EAR, or other application archive file 50 is copied or transmitted from the central database server 10 to the various application servers 20, 22 over the Internet, a wide area network, a corporate intranet, or other digital network. In some embodiments, the transmission from the central database server 10 to the destination application server 20, 22 is proxied through one or more intermediate servers residing inside of the firewall 14. Other transmission or copying mechanisms can be employed, such as accomplishing the transfer manually using a portable storage medium such as an optical compact disk (CD).

In the illustrated embodiment, the WAR application archive 50 contains the JAR content archive 32. It is also contemplated, however, to employ additional archive levels. For example, the database engine 18 and the content archive 32 can be archived into an EAR or WAR application archive, which is in turn archived into an EAR or WAR archive that archives the application archive containing the database engine 18 and the content archive 32, and that additionally archives the application software 46.

Figure 2:
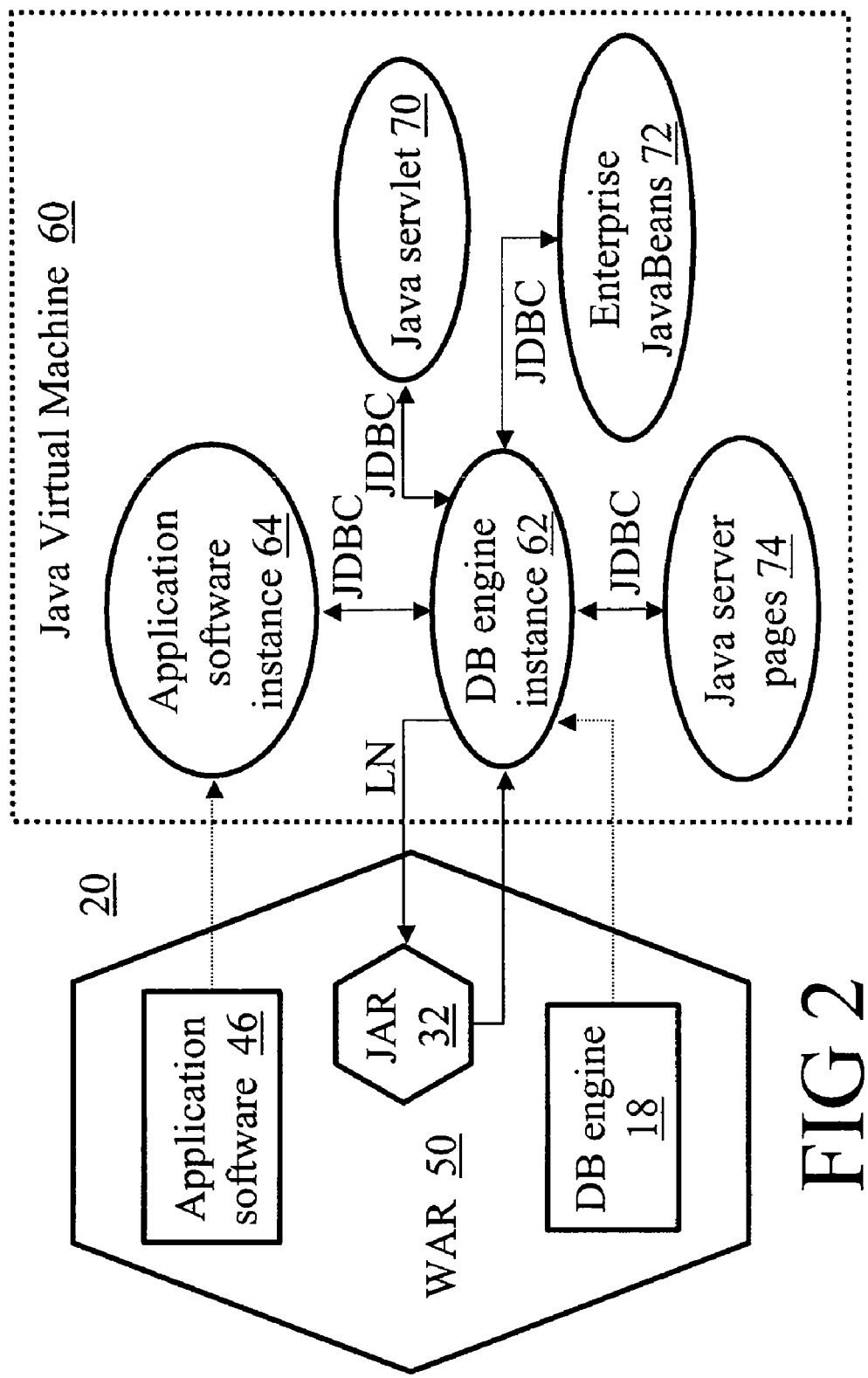
FIG. 2 diagrammatically shows deployment of the machine-independent database application archive on an exemplary one of the application servers.

With reference to FIG. 2, which diagrammatically shows database operation on the exemplary application server 20, the application archive file 50 is received at the application server 20. The application server 20 supports a Java virtual machine 60 or other suitable computer code execution environment that is adapted to execute self-contained application archive files. The Java virtual machine 60 deploys the application archive file 50 by loading the supporting database engine software 18 into memory to define a database engine instance 62 executing under the Java virtual machine 60 on the application server 20. Optionally, the supporting application software 46 is also loaded into memory to define an application software instance 64 executing under the Java virtual machine 60. In the exemplary J2EE platform, the loading and executing is suitably accomplished using J2EE deployment tools.

The database engine instance 62 is registered with the J2EE platform and is accessed as a Java resource by the application software instance 64 or by other programs such as a Java servlet instance 70, an Enterprise JavaBeans instance 72, a Java server pages instance 74 or the like. In the J2EE environment, the database engine instance 62 is accessed as a resource by the using Java database connections (JDBC's) established using a Data Source (javax.sql.DataSource) paradigm provided by JDBC. In this approach database requests such as SQL statements made by applications 64, 70, 72, 74 are processed entirely within the Java virtual machine 60 of the application server 20.

The database engine instance 62 accesses the database content stored in the JAR content archive 32 contained in the WAR application archive 50 using the path to the content within the JAR content archive 32. The content remains in the platform-independent content archive 32, and is not unpacked to the local file system or other machine-dependent environment. The database within the content archive 32 is exposed to applications and is accessed by applications using a logical name (LN) such as the database logical name (DBLN). The DBLN remains constant regardless of the physical installation details of the application server 20.

For example, one of the applications 64, 70, 72, 74 can access the content using a JDBC uniform resource locator (URL) of the form jdbc:<edge database system protocol>:<DBLN> where <edge database system protocol> references the database engine instance 62, or using a JDBC DataSource object with the databaseName property configured to DBLN, or so forth, without having knowledge of the physical configuration of the application server 20. In a suitable embodiment operating in the preferred J2EE environment, the database engine instance 62 accesses the content stored in the content archive 32 as a resource using the getResource( ) or getResourceAsStream( )methods of the java.lang.ClassLoader or using another suitable resource access tool, with the logical name argument LN identifying the content archive 32.

With reference to FIGS. 1 and 2, in the illustrated embodiment the database engine instance 16 executing on the central database server 10 and the database engine instance 62 executing on the application server 20 are instances of the same database engine program 18. In this preferred embodiment, the database engine program 18 is configured to perform read-write operations on the database when the database is embodied as files stored directly on the operating system's file system, as is the case for the central database server 10. In this read-write mode, the database is accessible through standard Java file I/O classes and methods, such as classes and methods in the java.io package.

On the other hand, the database engine program 18 is configured to perform read-only operations on the database when the database is embodied as a content archive such as the JAR archive 32, as is the case for the application server 20. Advantageously, in this read-only mode the database is also accessible through standard Java file I/O classes and methods, because the JAR archive 32 is also accessible through standard Java file I/O classes and methods.

Although in the preferred embodiment the database engine instances 16, 62 are instances of the same machine-independent database engine program 18, it is also contemplated to deploy a different database program on the application servers from the database program deployed on the central database server. In this latter embodiment, the database engine program deployed on the central database server optionally is not deployed in a machine independent language such as Java, and optionally does not support content archives, application archives, and the like. For example, the database engine program deployed on the central database server could be a C++ program compiled into machine-specific binary executable code.

Figure 3:
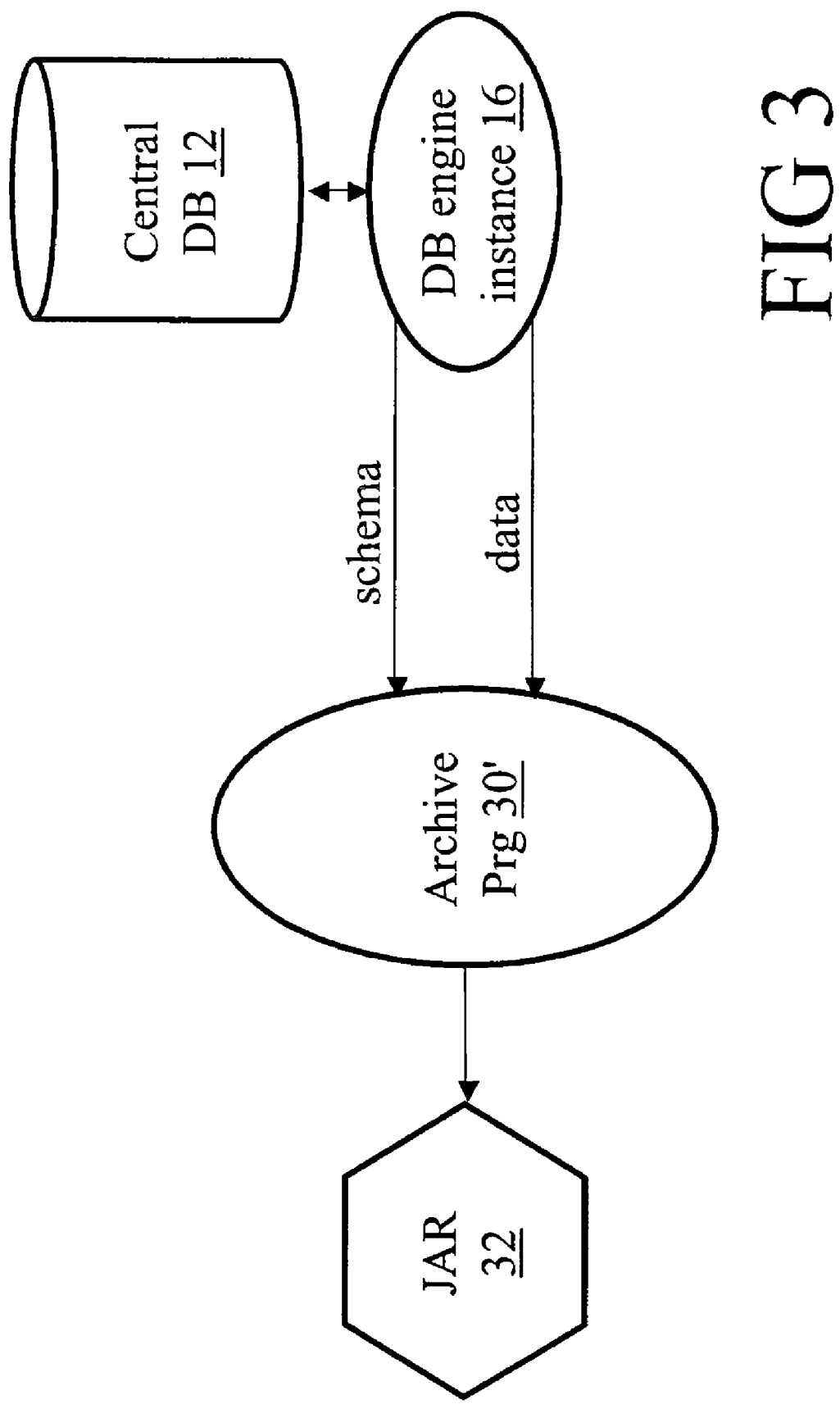
FIG. 3 diagrammatically shows an alternative approach for generating the content archive of FIGS. 1 and 2.

With reference to FIG. 3, an alternative embodiment 30' of the first archiving module 30 (shown in FIG. 1) is described. The alternative first archiving module 30' collects data and schema from the central database 12 via the database engine instance 16 on the central database server 10, and archives it in the content archive 32, which is preferably a Java archive (JAR). The first archiving module 30' can be a separate executing program as shown, or it can be integrated into the database engine instance 16. In the alternative first archiving module 30', the staging database 40 for organizing data collected from sources 36, 38 other than the central database 12 is omitted, since data collected from the central database 12 is already organized according to schema of the central database 12.

With reference to FIGS. 1-3, preferred methods and apparatuses for pushing database content to edge servers in a machine-independent manner is described. The content in the edge server is accessible in a read-only fashion, and is preferably updated occasionally to reflect changes in the content of the central database 12 residing on the central database server 10. For example, the central database 12 may contain a product catalog that is updated occasionally. After a catalog update, the updated content is preferably pushed to the edge servers. In the case of a product catalog application, updating occurs relatively infrequently, for example on a monthly or quarterly basis. Other database applications, such as an on-line trading marketplace, may employ more frequent updates, such as on a daily, hourly, or even more frequent basis.

Updating is suitably accomplished by creating an updated content archive 32 and archiving the updated content archive 32 into an updated application archive 50 at the central database server 10. The updated application archive 50 is transmitted or copied to the application servers 20, 22, where it replaces the previous application archive 50. Replacement by the updated application archive 50 at the application server 20 can be accomplished by shutting down the database engine instance 62 and deploying the database engine program 18 contained in the updated application archive 50.

However, this re-deployment approach has the disadvantage that applications 64, 70, 72, 74 that are accessing the database during shutdown of the database engine instance 62 receive an invalidation of the Java database connection (JDBC), which typically causes an abort or other disruption of execution of the applications 64, 70, 72, 74. For example, in a product catalog application, a user who is using an interactive product catalog html page may receive an error when the database JDBC is invalidated, and the user's data inputted to the html page may be lost. This disconnect and/or lost input data can be a substantial inconvenience if the user had drilled down several menu levels of the product catalog, or if the user was in the process of inputting a complex search pattern.

To reduce a likelihood of application disconnect and/or lost data during refresh, in a preferred embodiment the database engine program 18 is configured to provide transparency to accessing applications 64, 70, 72, 74 when the database is refreshed. In this approach, an updated application archive 50 is received at the exemplary application server 20 in substantially the same manner as in the re-deployment approach. In the preferred database refresh approach, however, the database engine instance 62 does not respond by shutting down. Rather, the database engine instance 62 detects the updated application archive 50 and performs a controlled switchover to the updated content archive 32 without shutting down.

In the preferred approach, at the time the database is initially deployed, the database identifier DBID is saved in memory as the current database identifier (CDBID). The content archive 32 version number (VSN) is also saved in memory as the current version number (CVSN). At each JDBC request, the DBID and the VSN of the content archive 32 are compared with the CDBID and CVSN, respectively. A difference between the DBID and the CDBID or between the VSN and the CVSN indicates a refresh has occurred. If no refresh has occurred, then the JDBC request is processed as usual.

If, however, a refresh is detected, the database engine instance 62 blocks new JDBC connections from being opened to the database. Existing JDBC connections that are in an idle state are blocked from initiating new JDBC requests. JDBC connections that are in an active state are processed according to an isolation level of the JDBC request. Generally, higher isolation level requests are completed, that is, processed until they are committed or rolled back. This assures data consistency during the transaction associated with the JDBC request. Lower isolation level requests may be interrupted, for example by sending an exception to the application, to prepare the JDBC connection for switchover to the updated database.

Figure 4:
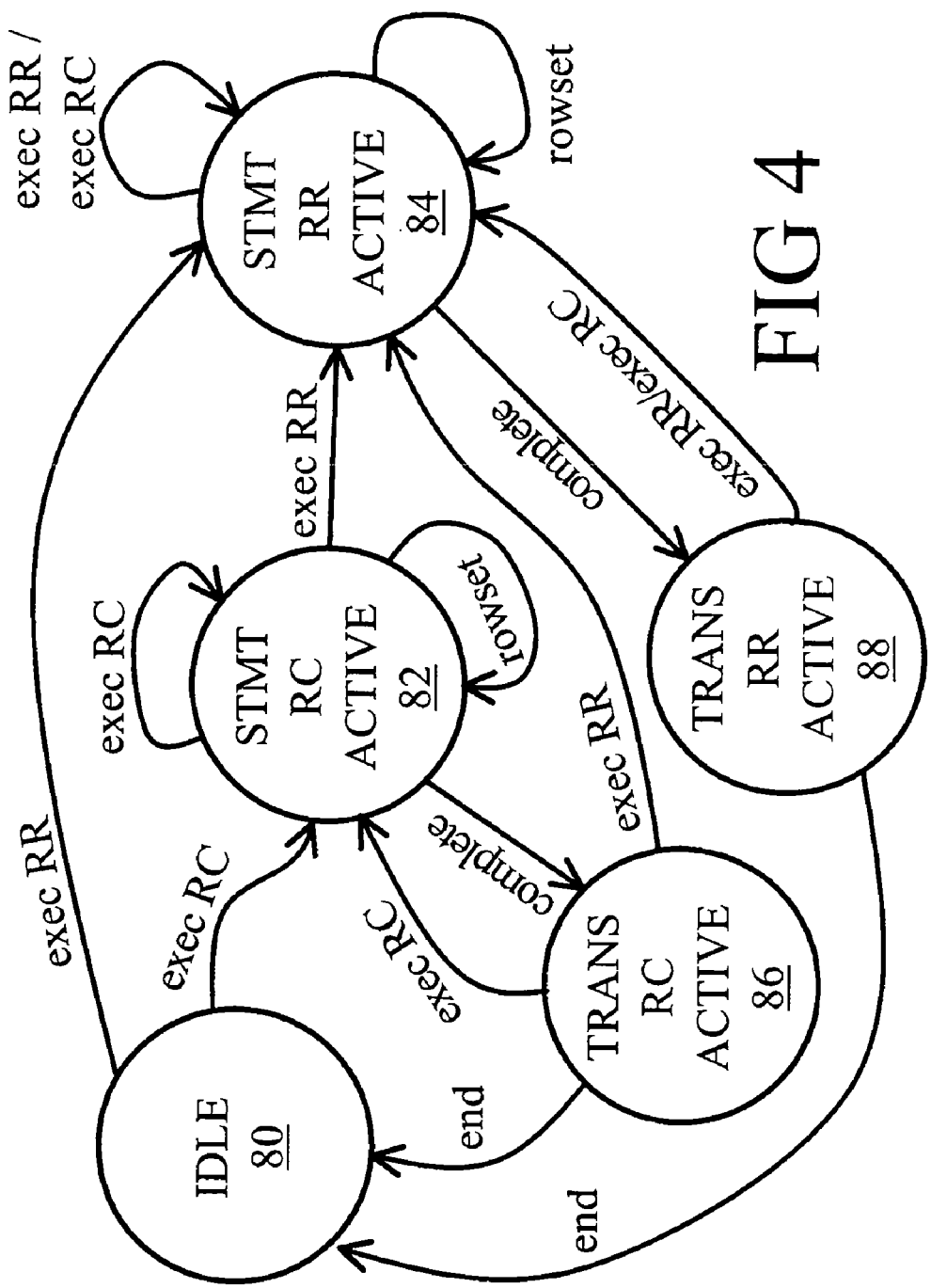
FIG. 4 shows an exemplary state diagram for database connection transactions.

With reference to FIG. 4, an exemplary approach for handling active requests during refresh is described in greater detail. The exemplary database system has JDBC connections with five possible states. An IDLE state 80 corresponds to a JDBC connection that has not started a transaction, that is, to an inactive or idle JDBC connection.

A STMT RC ACTIVE state 82 corresponds to a JDBC connection that has one or more statements active and that has never executed a statement at the JDBC isolation level java.sql.Connection.TRANSACTION_REPEATABLE_READ or at the JDBC isolation level java.sql.Connection.TRANSACTION_SERIALIZA-BLE.

A STMT RR ACTIVE state 84 corresponds to a JDBC connection that has one or more statements active and that has executed at least one statement at the JDBC isolation level java.sql.Connection.TRANSACTION_REP-EAT-ABLE_READ or at the JDBC isolation level java.sql.Connection.TRANSACTIO-N_SERIALIZABLE.

A TRANS RC ACTIVE state 86 corresponds to a JDBC connection that has no active statements and that has never executed a statement at the JDBC isolation level java.sql.Connection.TRANSACTION_REPEATABLE_READ or at the JDBC isolation level java.sql.Connection.TRANSACTION_SERIALIZABLE, but which has not yet completed the transaction by committing or rolling back.

A TRANS RR ACTIVE state 88 corresponds to a JDBC connection that has no active statements and that has executed at least one statement at the JDBC isolation level java.sql.Connection.TRANSACTION_REPEATABLE_READ or at the JDBC isolation level java.sql.Connection.TRANSACTION_SERIALIZAB-LE, but which has not yet completed the transaction by committing or rolling back.

As shown in FIG. 4, state transitions include: "execRC", "execRR", "rowset", "complete", and "end". The state transition "execRC" corresponds to executing an SQL statement at the java.sql.Connection.TRAN-SACTION_READ_COMMITTED or the java.sql.Connection.TRANSACTION_READ_UNCOMMI-TTED JDBC isolation levels. The state transition "execRR" corresponds to executing an SQL statement at the java.sql.Connection.TRANSACTION_REPEATA-BLE_READ or the java.sql.Connection.TRANSACTION_SERIALIZE JDBC isolation levels. The state transition "rowset" corresponds to a processing one or more ResultSet objects that are produced by an SQL statement execution. For example, the state transition "rowset" can correspond to fetching the rows. The state transition "complete" corresponds to completion of execution of an SQL statement by closing all of the ResultSet objects it created. The state transition "end" corresponds to completing a transaction by committing it or rolling it back.

When a database refresh occurs, opening of new JDBC connections are blocked. Those JDBC connections that are in or during a selectable delay period of typically a few seconds enter into the IDLE state 80 or the TRANS RC ACTIVE state 86 are blocked from changing state, that is, they are blocked from executing any "exec RR" or "exec RC" state transition. For a JDBC connection in the TRANS RR ACTIVE state 88 or the STMT RR ACTIVE state 84 a selectable delay period of typically a few seconds is provided for the connection to change to the IDLE state 80 through an available state transition. Once the JDBC connection has entered the IDLE state it is blocked from executing any statement. An exception is sent to the application if the JDBC connection has not returned to the IDLE state 80 when the selectable delay period expires. This exception returns the JDBC connection to the IDLE state 80 where it is blocked from executing any statement. For each JDBC connection in the STMT RC ACTIVE state 82 a selectable delay period of typically a few seconds is provided for the JDBC connection to change to the IDLE state 80 or TRANS RC ACTIVE state 86 through an available state transition. An exception is sent to the application if the JDBC connection has not returned to the IDLE state 80 or TRANS RC ACTIVE state 86 when the selectable delay period expires. This exception returns the JDBC connection to the IDLE state 80 where it is blocked from executing any statement.

Once the selectable delay period has elapsed, all JDBC connections are blocked from proceeding. The database engine instance 62 discards or invalidates its internal structures that refer to the content archive 32 or content extracted therefrom. These actions typically include, for example, discarding content from the content archive 32 that is cached in memory from the database's pre-refresh version, and discarding schema information cached in memory from the content archive 32.

Advantageously, these actions typically do not invalidate or significantly disrupt the JDBC connections to the applications 64, 70, 72, 74. For example, JDBC objects implemented by JDBC interfaces java.sql.PreparedStatement, java.sql.PreparedStatement, java.sql.CallableStatement, and java.sql.Connection are not invalidated by these actions. Thus this allows the applications 64, 70, 72, 74 to continue using their JDBC objects after a refresh occurs.

With the JDBC connections in blocked or idle states and cached or buffered content from the current content archive 32 discarded, the database engine instance 62 internally boots the post-refresh version of the content archive 32 and re-connects the open JDBC objects to in-memory data structures associated with the post-refresh version of the content archive 32. The CDBID and CVSN values are updated with the DBID and VSN, respectively, of the new content archive 32. Open connections are unblocked to allow continuation of executing SQL statements and completion of transactions. The block against opening new JDBC connections is also removed to allow the creation of new connections. If a JDBC connection received an exception during the selectable delay period or at timeout of that period, then the application optionally retries the transaction. This is similar in effect to the application receiving a deadlock exception in a typical database system.

Advantageously, the above-described refresh approach reduces a likelihood of substantial disruption or termination of applications during the refresh, as compared with the re-deployment approach in which the database engine instance 62 is shut down and the new application archive 50 deployed in its place. However, in some instances there may be an interruption or other problem that causes shutdown of the database engine instance 62. For example, the database engine instance 62 may itself be updated along with a content update, or the application server may crash. In these and similar situations, the re-deployment approach can be employed, which refreshes the content archive 32, the database engine instance 62, and optionally the application software instance 62.

The described embodiments are exemplary only. Those skilled in the art can readily make suitable modifications to the described embodiments for implementation on specific distributed database networks. For instance, rather than the exemplary J2EE operating environment, the content distribution methods and apparatuses described herein can be adapted for use in conjunction with a Microsoft .NET platform using archiving mechanisms of that platform which are similar to Java archiving, Enterprise application archiving, and web archiving mechanisms of J2EE.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, what is claimed is:

1. A central database server configured to distribute database content between the central database server and a plurality of associated application servers, the central database server comprising:

a processor;

a central database containing central database content;

a first archiving module archiving at least some of the central database content into a first content archive file, the first archiving module being configured to:

organize a staging database including i) schema and at least some content of the central database residing on the central database server, and ii) content from a source other than the central database;

provide the staging database with a logical name;

first archive the staging database as the first content archive file, the at least some content of the central database being in a machine and operating system independent format; and, associate the first content archive file with a version identifier; and, a second archiving module archiving the first content archive file and supporting software into an executable application archive, wherein the executable application archive is adapted to be executed by a remote application server, the second archiving module being configured to archive:

i) the first content archive file of the first archiving, and ii) the supporting software including a database engine and an additional application module, as a self-contained executable distribution archive file;

distribute the self contained executable distribution archive file to the plurality of associated application servers other than the central database server for executing the self-contained executable distribution archive file including executing an instance of the database engine and the additional application module on at least one of the plurality of associated application servers to organize the content of the first content archive file into a database in accordance with the at least some content of the central database in the machine and operating system independent format, the database engine and additional application module instance being configured to access the at least some content by the logical name in a read only fashion; and, distribute to the plurality of associated application servers an updated content archive file contained in an updated self-contained executable distribution archive file and having a second version identifier different than the first version identifier, the plurality of associated application servers being adapted to, responsive to receiving the updated content archive file, perform a controlled switchover from using the first content archive file to using the updated content archive file without terminating executing the instance of the database engine by blocking formation of new database connections, closing open database connections, booting the updated distribution archive file, and unblocking formation of new database connections.

2. The central database server as set forth in claim 1, wherein the first archiving module is configured to:
first archive at least some schema of the central database in the first content archive file, the supporting software being adapted to reference the archived schema when accessing content archived in the first content archive file.

3. The central database server as set forth in claim 1, wherein said first archiving module is configured to:
first archive the at least some content of the central database as a Java archive (JAR) file.

4. The central database server as set forth in claim 3, wherein the second archiving module is configured to archive the first content archive file and the supporting software as the self contained executable distribution archive file including second archiving the first content archive file and supporting software as one of an enterprise application archive (EAR) file and a web archive (WAR) file.

5. The central database server as set forth in claim 4, wherein the first and second archiving modules are configured to repeat the first archiving of at least some content, the second archiving of the first content archive file and supporting software, and the distributing to effect an updating of the application servers.

6. A central database server configured to push database content to an associated remote application server implemented in a computer-readable storage medium and configured to support a remote database adapted to receive the database content pushed into the remote database by the central database server, the central database server comprising:
a processor;
a central database containing central database content; and,
first and second archiving modules configured to generate a self-contained executable database application archive file containing a first content archive file in a machine and operating system independent format, an additional application module, and a database engine configured to organize the first content archive file into a database,
the first archiving module being configured to generate the first content archive file by:
organizing a staging database including i) content extracted from the central database of the central database server and formatted in said machine and operating system independent format, ii) schema of the central database of the central database server, and iii) content from one or more sources other than the central database;
providing the staging database with a logical name;
first archiving the staging database as said first content archive file;
assigning a first version number to the first content archive file;
the second archiving module being configured to second archive i) said first content archive file, ii) the additional application module, and iii) computer code including said database engine as said self-contained executable database application archive file;
wherein the computer code execution environment of the associated remote application server is configured to execute the self-contained executable database application archive file including executing an instance of the additional application module and an instance of the database engine to organize the content of the first content archive file in the machine and operating system independent format into a database in accordance with said schema of the central database, the database engine instance and the additional application module instance being configured to access the contents of the staging database by the logical name in a read only fashion;
wherein the computer code execution environment of the associated remote application server is responsive to receiving an updated content archive file contained in an updated self-contained executable database application archive file and having a second version number different than the first version number of the first content archive file, to perform a controlled switchover from using the first content archive file to using the updated content archive file without terminating the execution of the database engine; and,
wherein the computer code execution environment of the associated remote application server includes:
a connection screening module adapted to determine whether the first content archive file is a latest version; and
a refresh module operating responsive to the connection screening module determining that a newer version of the first content archive file is extant, the refresh module operating to perform the controlled switchover by:
blocking formation of new database connections,
closing open database connections,
booting the updated content archive file, and
unblocking formation of new database connections.

7. The central database server as set forth in claim 6, wherein:
the computer code execution environment is a Java 2 Enterprise Edition (J2EE) environment; and
the database application archive file is one of an Enterprise Application Archive (EAR) file and a Web archive (WAR) file.

8. The central database server as set forth in claim 7, wherein the first content archive file is a Java archive (JAR) file contained in the database application archive file.

9. The central database server as set forth in claim 8, wherein the schema stored in the database application archive file are stored in the Java archive (JAR) file contained in the database application archive file.

10. The central database server as set forth in claim 8, wherein contents of the Java archive (JAR) file include non-database content extracted from at least one non-database source, wherein the non-database content is organized by the schema stored in the database application archive file.

11. The central database server as set forth in claim 6, wherein:
said schema contained in said database application archive file is a portion of the schema of the central database of the central database server.

12. The central database server as set forth in claim 6, wherein the database engine instance is adapted to access the first content archive file using a content archive identifier contained in the database application archive file as the logical name.

* * * * *